Jan. 24, 1961　　E. M. POZNANSKI　　2,968,844
SIDE OPENINGS FOR BOX CARS
Filed July 16, 1959　　4 Sheets-Sheet 1
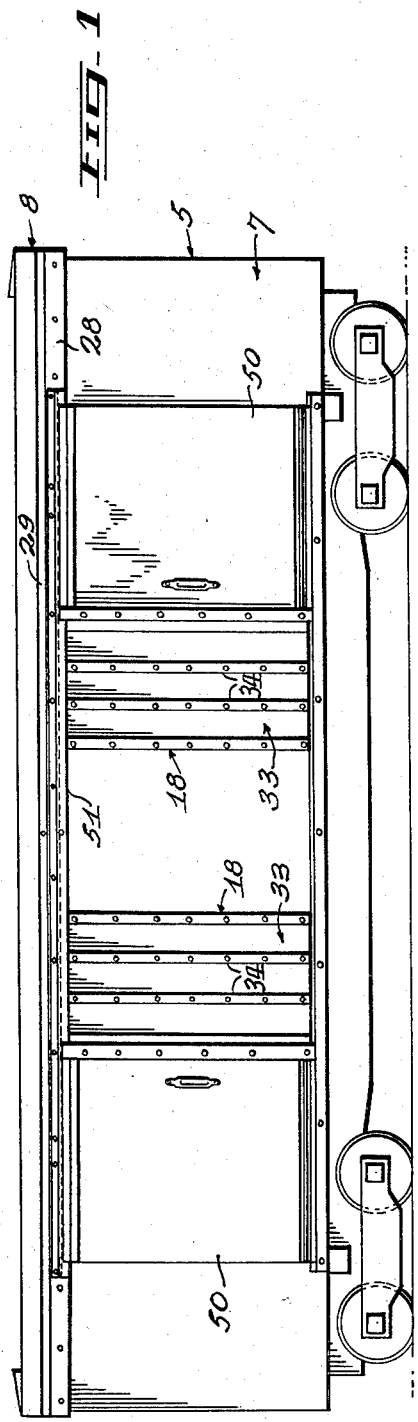
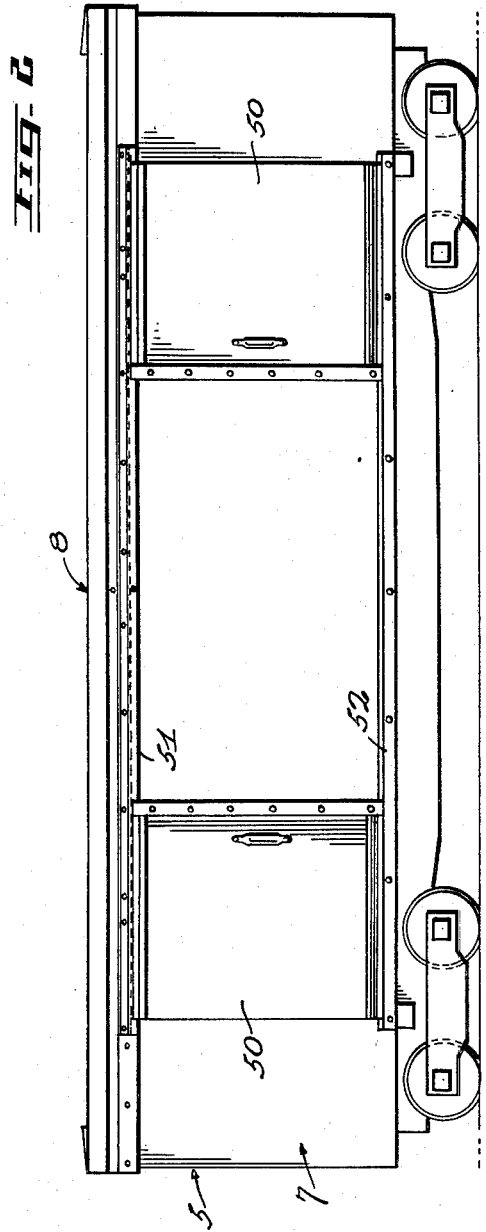
Inventor
E. M. POZNANSKI
By Fetherstonhaugh & Co.
Attorneys

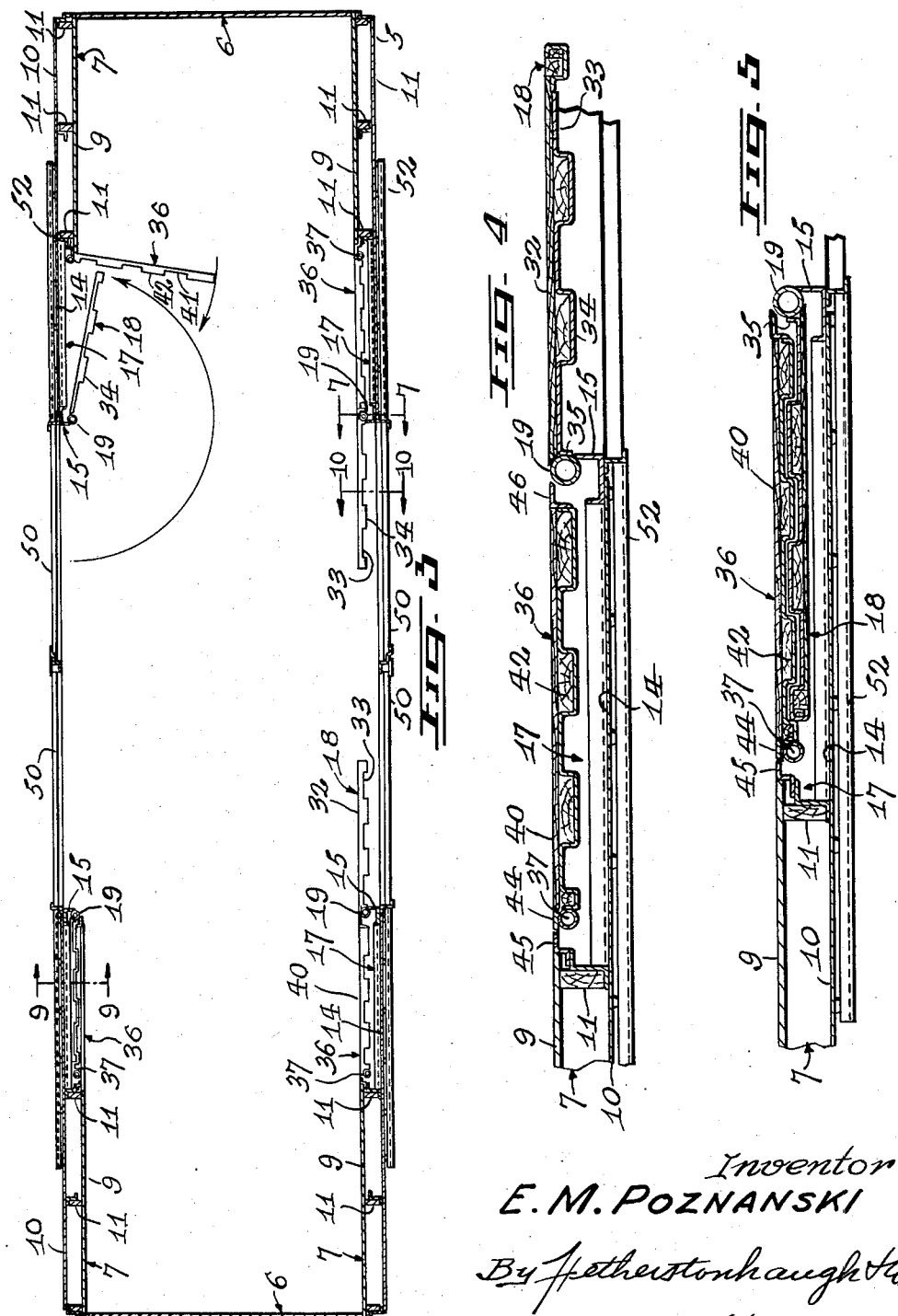

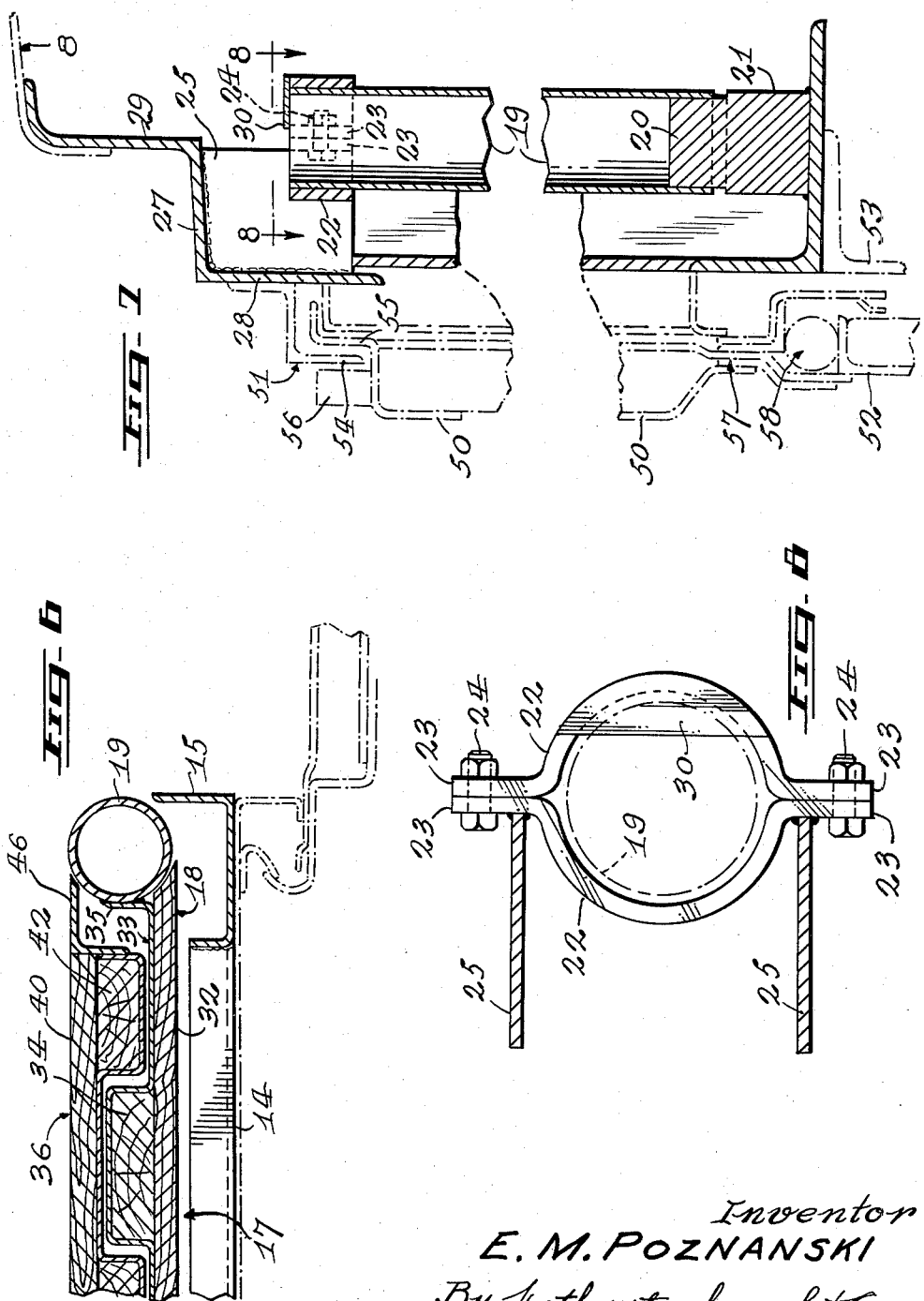

Jan. 24, 1961  E. M. POZNANSKI  2,968,844
SIDE OPENINGS FOR BOX CARS
Filed July 16, 1959  4 Sheets-Sheet 4
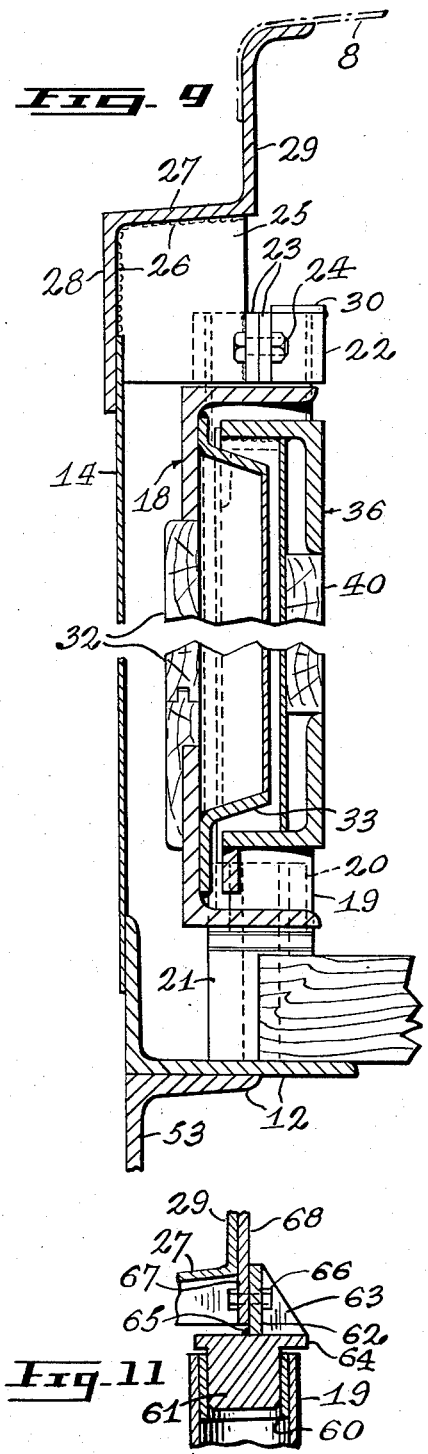
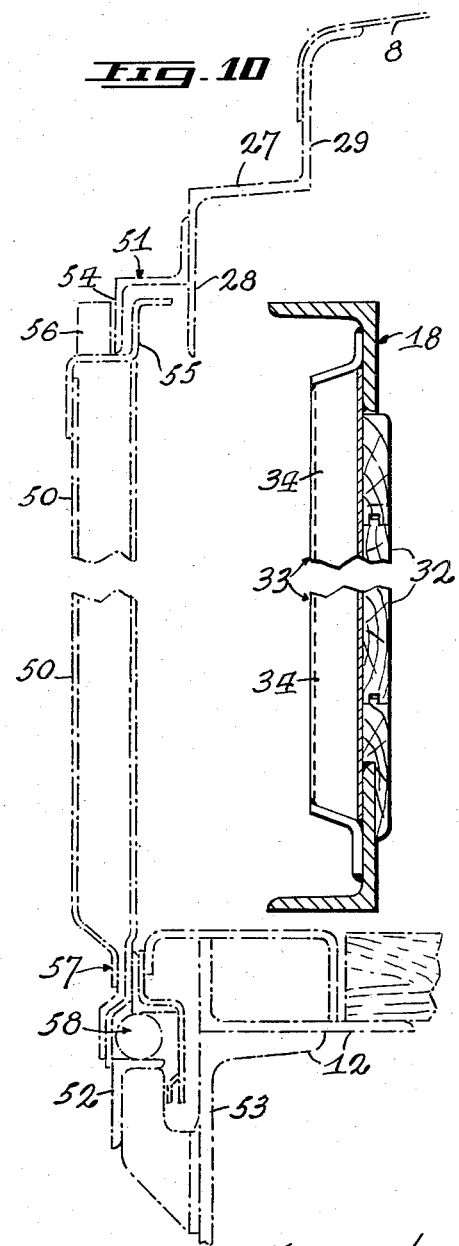
Inventor
E. M. POZNANSKI
By Fetherstonhaugh & Co.
Attorneys

United States Patent Office 2,968,844
Patented Jan. 24, 1961

2,968,844

SIDE OPENINGS FOR BOX CARS

Edmund M. Poznanski, Montreal, Quebec, Canada, assignor to Canadian National Railway Company, Montreal, Quebec, Canada Filed July 16, 1959, Ser. No. 827,604

Claims priority, application Canada May 29, 1959

9 Claims. (Cl. 20—28)

This invention relates to improvements in box cars and more particularly to improvements in car side door structures which are adjustable to vary the width of the car door opening.

A particular object of this invention is to provide a box car with side door structures which are readily convertible from a standard car door opening to varying widths of greater dimensions so as to adapt the car for grain service and for the loading and unloading by means of mechanical equipment as well as for loading and unloading specialized commodities, such as plywood, wallboard, lumber and the like.

Another object is to provide a double-wall side structure for box cars with extensible panel sections in which the inner surface of each extensible panel sections is adapted to lie in the vertical plane of the lining of said wall in the extended position and with other panel sections adapted to extend between the permanent side wall and the extended panel section in the plane of the lining of said wall to provide an uninterrupted lining surface for the side wall of the car.

Heretofore, box cars having side door openings of greater than standard width could only serve for specialized purposes. While they were practical for mechanized loadings and for loading of large size commodities, they could not be used for grain loadings, particularly if the openings was greater than 8 feet in width. Even an 8 foot opening required much heavier and costlier materials to close the gap for converting to grain loading. For practical purposes, therefore, the wide door opening type cars were limited in use to the transportation of special freight commodities only.

In addition, these wide door opening cars limit the capacity of the car since many shippers refuse to utilize the space opposite the door openings unless the door way is adequately protected. This would reduce the loading of a car considerably below its load capacity and thereby increase the cost of transportation.

Moreover, since these wide door type cars were limited to certain types of commodities, it frequently necessitated returning the cars to their starting point unloaded.

Other wire door types have been experimented with, in which sliding panels have been provided to reduce or increase the width of the door opening. While this type had certain advantages, it still presented the problem of a broken or interrupted lining surface for the side walls. In this connection it will be appreciated that for grain carryings the sidewalls if interrupted by projections or recesses present a cleaning and unloading problem. This is particularly to case where the sliding doors are in lapping relation with the inner lining of the car side walls. Care must be taken to ensure that the door tracks as well as the side margins between the door and lining are sealed prevent clogging by grain which would interfere with adjustment of the panels. This not only increases manufacturing costs but also increases maintenance due to the frequent failures of the seals.

The present invention proposes to remedy these defects and to provide a box car which is readily convertible from a grain car to a standard width door type box car or to a wide type door box car of varying widths with a minimum amount of adjustment. This is accomplished by the provision of an extensible panel at each side of a door opening in which each panel is pivotally mounted to swing about a vertical axis located at the point of maximum width of the car door opening, the panel being selectively swingable to an extended position in the plane of the inner lining of the car side wall to reduce the car door opening and to a recessed position within the side wall to increase the door opening to its maximum width.

Another feature of the invention consists in the provision of a second panel which is pivotally mounted in said recess provided in the side wall to swing about a vertical axis so as to provide a recess closure which lies in the plane of the box car lining and the plane of the first panel in its extended position, said second panel also serving to cover the first panel when the latter is within the recess.

The above combination of first and second panels at either end of each car side opening will permit the extension of the side wall from both ends to reduce the side door opening to a standard width and at the same time provide a continuous lining surface. In this condition the car is usable either as a standard box car or for grain loading. Alternatively, one or both of the first panels may be swung to its recessed position in the car side wall and the recess is covered by the second panel either with or without the first panel disposed therein. Thus the opening may be selectively increased to an intermediate or to a maximum width while still maintaining an unbroken lining surface.

Still a further feature consists in providing the exposed surfaces of the first and second panels with wooden lining and nailing strips in the same manner as the permanent side wall lining so that the utility of the lining is constant. This enables shippers of certain commodities to utilize at least as much of the space of this type of box car as they are able to use in standard type box car having rigid side walls up to the door opening.

A further object of this invention is to provide sliding outside doors in combination with the inside panel extensions of the character described, in which these sliding doors are of a width which will provide closure for the car for the maximum width of the car door opening. The advantage of this is that in cases where maximum width is required for loading and where it is not necessary or desirable to extend the panels to reduce the opening, said sliding doors may be utilized to seal the car during transit.

The above and other objects, features and characteristics of this invention will be understood more readily from the following detailed description taken in connection with the accompanying drawings in which:

Fig. 1 is a side elevational view of a box car embodying my invention.

Fig. 2 is a view similar to Fig. 1 but showing certain parts in a different relation.

Fig. 3 is a plan view in section of a car embodying my invention.

Fig. 4 is a fragmentary view, enlarged, of a portion of a side wall shown in Fig. 3.

Fig. 5 is a view similar to Fig. 4 but showing certain parts in a different relation.

Fig. 6 is a further enlarged view of a fragment of the side wall shown in Fig. 5.

Fig. 7 is an enlarged sectional view taken along the lines 7—7 of Fig. 3.

Fig. 8 is a sectional view taken along the lines 8—8 of Fig. 7.

Fig. 9 is an enlarged sectional view taken along the lines 9—9 of Fig. 3.

Fig. 10 is an enlarged sectional view taken along the lines 10—10 of Fig. 3.

Fig. 11 is an enlarged sectional view of a modification of the door upper hinge.

Referring more particularly to the drawings, 5 generally designates a box car, including end walls generally indicated at 6, permanent double-wall side sections 7 and a roof 8.

Each double-wall side section 7 extends for a predetermined distance from an end wall 6 towards the central section of the car and consists of an inner lining 9 and an outer sheeting 10 held in spaced relation by vertical supporting frame members 11 which are secured at their upper and lower ends respectively to the roof 8 and the floor structure 12 of the car. An extension 14 of the outer sheeting 10 of each double-walled side section 7 is secured along its remote side edge to the outersurface of an inwardly directed channel-section supporting member 15 which extends between the roof and floor structures 8 and 12. This, in effect, provides a recess 17 in the inner surface of the side wall between the innermost vertical frame member 11 and the channel-section supporting member 15.

The recessed portion of each side wall section is adapted to receive an extensible panel 18 which is secured along one side margin to a post 19 to pivot about a vertical axis. The post 19 is tubular and is fitted about a reduced cylindrical neck 20 of a supporting base 21. The base 21 is secured to the floor structure 12 inwardly of the channel-section supporting member 15 so that the tubular post 19 will rotate relative to said base about a vertical axis and will lie within the vertical plane of the side wall inner lining 9. The upper end of post 19 rotates within a split collar 22. Collar 22 is composed of two half-sections which are joined together by complementary flanges and bolts 23 and 24 respectively. One of said half-sections is provided with a pair of unidirectional, laterally spaced, parallel, vertically disposed flange plates 25 which are secured by welding along their upper and outer side margins, as indicated at 26, to outward and downward projecting flange portions 27 and 28 respectively, of a longitudinal supporting beam, generally indicated at 29, which extends between the side margins of the roof 8 and the upper end of the side wall structures 7 at one side of the car. The other of said collar half-sections is provided with a cap or top plate 30 which extends across the upper margin of a substantial portion of said collar half-section. The cap or top plate 30 is adapted to prevent vertical movement of tubular post 19 and thereby maintain the lower end of post 19 on the cylindrical neck 20 of supporting base 21.

The extensible panel 18 is provided with one surface 32 which is similar in structure to the inner lining 9 of the double-wall side sections 7 and with an opposing surface 33, having laterally spaced vertical reinforcing ribs 34. A flange extension 35 of the sheeting forming said surface 33 is secured along the length of post 19 so that, when the panel is swung outwardly to its extended position across a portion of the central opening between the double-wall side sections 7, the surface 32 of the panel will extend along the vertical plane of the surface of said inner lining 9, and when swung inwardly will lie within the said recess 17 with the ribbed surface 33 lying substantially behind the vertical plane of said inner lining 9.

A second panel 36 is mounted in said recess 17 to rotate about a post 37. Post 37 is located within said recess substantially adjacent the innermost vertical frame member 11 of side section 7. The post 37 may be supported between the floor structure 12 and the roof 8 in any suitable manner, for example, in the same manner as post 19 between a base of the type designated 21 and a collar of the type designated 22 so as to afford rotation of said post 37 about a vertical axis lying within the vertical plane of said inner linings 9.

The second panel 36 is provided with one surface 40 which is similar in structure to the inner lining 9 and with an opposing surface 41 having laterally spaced reinforcing ribs 42 which are complementary to the ribs 34 of panel 18 so that when the two panels are in lapping relation the ribs of one are disposed between the ribs of the other. Panel 36 is secured along one side margin to post 37 so that when the panel 36 extends across the recess 17 its surface 40 lies in the vertical plane of the lining 9. In this position a marginal flange extension 44 of the surface 40 projects beyond post 37 so that its edge is in close proximity with the opposing edge of a flange 45 carried by the innermost support 11 and lying in the vertical plane of the lining 9. The two flanges 44 and 45 provide a closure between the post 37 and said support 11 to prevent loose bulk material from entering into the recess 17. In addition, a third flange 46 projects beyond the side edge of panel 36 remote from its connection to post 37. Flange 46 which extends along the plane of inner lining 9 engages the post 19 to limit the panel 36 from swinging inwardly beyond the plane of said inner lining. The contact between flange 46 and post 19 also serves to prevent loose bulk material in the car from entering the recess 17 at that end thereof.

In the interfolded position of the panels 18 and 36 within the recess 17 the central opening through the side wall is substantially increased to facilitate the loading and unloading of specialized commodities, such as plywood sheets, wallboard, palletized loads, etc., which are of a greater length than the normal door width of a car.

When the ends of the car have been loaded or when it is desired to load the car with grain or other loose bulk material, the width of the car door opening may be reduced to the standard width. This is accomplished by first swinging the panel 36 inwardly about post 37 sufficiently to permit free swinging of panel 18 inwardly. Panel 18 is swung inwardly about the axis of post 19 and then outwardly to an extended position in the plane of the inner lining 9. Panel 36 is then swung back to its position across the recess 17 so that the combined panels 36 and 18 form a continuous extension of the inner lining 9 toward the central section of the car. When the panels 18 are extended from opposite ends of the car the central opening is reduced to a standard width. Any suitable means (not shown) may be provided for retaining the panel 18 in its extended position and for securing the panel 36 across the recess 17.

Each side of the car is also provided with a pair of sliding doors 50 which are mounted outwardly of the outer side wall of the car in upper and lower guide rails 51 and 52. Guide rails 51 and 52 are carried by the flange 28 of roof supporting beam 29 and the side beams 53 of the floor structure respectively. A flange 54 of the upper rail 51 extends into a channel formed by inner and outer members 55 and 56 at the upper end of the door 50, and a yoke 57 formed at the lower end of the door straddles the lower guide rail 52. Suitable bearings, generally indicated at 58, facilitate sliding movement of the door.

The doors 50 are of a sufficient width to extend from the center of the car to just beyond the channel-section supporting member 15 when said doors are closed, and the guide rails 51 and 52 are of a length which will permit sliding of the doors for a distance equal to the maximum width of the side door opening.

This arrangement makes it possible to open the doors on opposite sides for the maximum width to facilitate car loading and unloading. Alternatively, the doors and/or extension panels on one side may be extended across the opening if loading on one side is sufficient. Another alternative would be to increase the door opening width toward one end only by swinging the adjacent panel 18 within the corresponding recess 17. The other panel 18 on that side of the car will be in its extended position.

The wide sliding outer doors also make it possible to close the sides of a car without extending the panels 18. Thus, it may be expedient to load the car utilizing the maximum door width. In certain instances it may not be desirable to extend the panels 18 after loading. Since the outer doors are sufficiently wide they may be brought together and secured to seal off the side opening. Then, too, the panels may be extended and the standard space therebetween may be boarded up in the usual manner for loading loose bulk such as grain.

The versatility of a car embodying the feature above described, makes it serviceable in many ways, thereby enabling the reduction in the number and in the types of rolling stock. In this conection, a single car may serve in several capacities, for example, as a grain carrier, as a standard box car provided with a standard width opening and as a wide door opening type car for mechanized loading and the like. Moreover, the arrangement according to the present invention makes it possible to convert from a standard door width to a wide door width and vice versa, without the provision of auxiliary equipment which must be dismantled and stored within the car when not in use. The car is also more readily convertible to a grain carrier from a wide door opening type car since the second panel 36 covers the recess 17 on the inner side when the panel 18 is extended thus providing a continuous inner lining surface for the car from each end to the grain door opening.

Fig. 11 shows a modified upper hinge member for the upper end of the door post 19. The upper portion of post 19 is lined with a bronze bush 60 which is press-fitted therein and a headed pin 61 is freely inserted within the bush 60 so as to afford rotation of the post relative to the pin. A bracket 62 provided with a reinforcing web 63 is welded to the head 64 of pin 61, as indicated at 65. The bracket 62 is then detachably secured by bolts 66 to the depending portion 67 of a plate member 68 which is secured to a portion of beam 29 along the inner surface thereof by welding or other suitable means.

The embodiments of the invention in which an exclusive property or privilege is claimed are defined as follows:

1. In a box car, including a roof and a floor structure and permanent side-wall structures extending from opposite ends for a predetermined distance toward a central side door opening, each permanent side-wall structure including an outer side wall sheeting and an inner lining inwardly spaced from said outer sheeting, said lining terminating short of the inner side margin of the outer sheeting to provide a recess in the inner surface of the side-wall structure, and a panel pivotally mounted within said recess adjacent the inner side margin of said sheeting of each permanent side-wall structure to swing about a vertical axis, the panel of each side-wall structure being swingable to a position of extension to decrease the side door opening characterized in that, when both panels on one side of the car are swung to positions of extension, the side door opening is reduced to a standard width, the panel of each side-wall structure also being swingable to lie within said recess to increase the width of the car side door opening.

2. A box car as set forth in claim 1 including a second panel pivotally mounted within said recess adjacent the side thereof remote from the pivotal mounting of said first mentioned panel, said second panel being disposed to lie within the recess with its inner surface in the vertical plane of the side-wall lining to cover the open face of the recess when the first mentioned panel is in its extended position and when it is also in its recessed position.

3. A box car as set forth in claim 2 in which the inner surface of the first panel when in its extended position is disposed to lie in the vertical plane of the side-wall lining.

4. A box car as set forth in claim 1, including outer door members mounted on the side of the car outwardly of the outer side wall sheeting for sliding movement, said outer door members each being of a width sufficient to extend across a half of the side door opening when the panel is in its recessed position.

5. A box car as set forth in claim 2, in which said first and second panel members are provided with spaced reinforcing ribs on one side thereof, the ribs of one panel being spaced apart so that each of the ribs of the other panel are receivable between successive pairs of ribs of the first panel when said first and second panels are disposed within said recess.

6. A box car as set forth in claim 1, including a vertical post supported at its lower end by the floor structure to rotate about a vertical axis within said recess and adjacent the inner side margin of said outer sheeting, said first panel having one side margin secured to said post for swinging movement to its position of extension and its position within said recess.

7. A box car as set forth in claim 6, in which said post is tubular, a base member carried by said floor structure and provided with a cylindrical neck about which said tubular post is fitted for rotation, and a collar fitted about the upper end of said post and being secured to the side of the car roof to support said post for rotation about its vertical axis.

8. A box car as set forth in claim 7, in which said collar is formed of two split sections adapted to be secured to each other when fitted about said post, one of said split sections being provided with vertically disposed, laterally extending, unidirectionally extending plate members having marginal portions secured to the side of the car roof for vertical alignment of the axis of said collar with the axis of said post.

9. A box car as set forth in claim 2, including a second vertical post supported at its lower end by the floor structure to rotate about a vertical axis within said recess adjacent the side margin of said recess remote from the pivotal mounting of said first panel, said second panel having one side margin secured to said second post for pivotal movement of said second panel about the axis of said second post.

References Cited in the file of this patent

UNITED STATES PATENTS 2,037,693  Beauchamp _____ Apr. 21, 1936